United States Patent Office 3,080,348
Patented Mar. 5, 1963

3,080,348
COPOLYMERS OF STYRENE AND METHYL
METHACRYLATE
John L. Lang, Midland, Clifford Jones, Linwood, and
Arthur F. Roche, Freeland, Mich., assignors to The
Dow Chemical Company, Midland, Mich., a corporation of Delaware
No Drawing. Filed Apr. 23, 1958, Ser. No. 730,240
3 Claims. (Cl. 260—86.7)

This invention pertains to improved copolymers of styrene and methyl methacrylate characterized by a high degree of molecular uniformity and homogeneity, and to a method of making the same.

This application is a continuation-in-part of a copending application, Serial No. 376,115, filed August 24, 1953, now abandoned.

Styrene and methyl methacrylate have heretofore been copolymerized in conventional ways, e.g. in bulk, in solution, and in aqueous emulsion. The art indicates that the copolymers possess properties which are generally intermediate between those of the corresponding homopolymers. However, the already known copolymer products of styrene and methyl methacrylate are molecularly non-uniform and non-homogeneous. That is to say, an ordinary copolymer product contains polymeric molecules of considerably divergent kinds. Such molecules differ both as to the proportion and arrangement of the starting monomeric units polymerically combined therein and as to the length and the molecular weight of such molecules. In many cases, the non-uniformity and non-homogeneity of the copolymer products are manifest as haziness in the products.

It has now been discovered that, when styrene and methyl methacrylate are copolymerized under certain conditions hereinafter specified, novel copolymers are obtained which are unusually uniform and homogeneous. An unexpected further advantage of these new copolymers is that their physical properties, particularly tensile strength, clarity, elongation, and molding characteristics, are especially good. These new copolymers are clear, hard, thermoplastic compositions suitable for molding and shaping by methods conventionally employed for polystyrene or polymethylmethacrylate plastics, e.g. by compression molding, injection molding, extrusion, hot shaping, machining, welding, etc.

The new copolymers are made, and the method of this invention is carried out, by heating a homogeneous liquid mixture of monomeric styrene, monomeric methyl methacrylate, and the copolymer product of copolymerization thereof, at a substantially constant polymerization temperature while feeding further amounts of monomeric styrene and monomeric methyl methacrylate to the mixture whereby to maintain a constant ratio of monomeric styrene to monomeric methyl methacrylate and a constant proportion thereof and of the copolymer product in the mixture.

The essential and critical requirements of this new method are (1) homogeneity of the liquid polymerization mixture, (2) constancy of composition of that polymerization reaction mixture, and (3) constancy of polymerization conditions.

More specifically, in the present method, the copolymerization of styrene and methyl methacrylate is carried out in a mono-phase liquid mixture, excluding immiscible solid or liquid constituents. Non-polymerizable, miscible liquid diluents can be employed provided they are substantially inert, i.e. not deleterious to the copolymerization reaction. Typical examples of suitable such diluents are benzene, toluene, xylene, ethylbenzene, chlorobenzene, cumene, and methyl ethyl ketone, which can be present in minor proportion, i.e. not more than 40, preferably from 0 to 30, percent by weight of the whole reaction mixture, provided that the proportion of such constituents, relative to the other constituents in the polymerization reaction mixture is held substantially constant.

The monomeric styrene and monomeric methyl methacrylate in the reaction mixture can be present in any desired constant proportion relative to each other from about 5:95 to about 95:5 parts by weight. The ratio in which the monomeric entities combine to form a copolymer molecule when the starting monomers are present in a particular proportion can readily be calculated by those skilled in the art from knowledge of the relative polymerization reaction rates. Conversely, the ratio of starting monomers necessary to be present to produce a particular copolymer product can likewise be calculated from such reaction rate data. Means and procedures for such calculations are fully described in "Coplymerization," by Turner Alfrey, Jr., John J. Bohrer, and H. Mark, published 1952 by Interscience Publishers, Inc., New York.

In the present method, the proportion of copolymer product in the reaction mixture is kept constant and relatively low, i.e. at a constant value from about ten percent by weight of the whole reaction mixture to about 60 percent of the combined weight of the monomers and the copolymer product.

The copolymerization is carried out at a substantially constant polymerization temperature between room temperature and about 250° C., preferably between 100° and 190° C. At lower temperatures, higher molecular weight products are obtained but at a lower rate, whereas higher temperatures give rise to faster rates of polymerization and lower molecular weight products.

The pressure applied to the polymerization reaction mixture is not critical but should be such as to maintain the constituents of the mixture in the liquid phase. Any available pressure can be used.

While heat alone can be used to activate the copolymerization, added soluble catalysts can be employed to accelerate the reaction. Suitable catalysts are ones which generate free radicals, examples of which are the organic peroxides and hydroperoxides such as benzoyl peroxide, cumene hydroperoxide, and di-tert-butyl peroxide, and azo catalysts such as $\alpha,\alpha'$-azobisisobutyronitrile. When added catalysts are employed, they are usually used in small amount, e.g. up to about one percent by weight of the reaction mixture and become a constituent of the reaction mixture the proportion of which must be kept substantially constant during the copolymerization reaction.

Any of several procedures can be used to provide constancy of composition and polymerization conditions in accordance with this method.

For example, it is possible to start a batch reaction with a relatively small charge of a mixture of styrene and methyl methacrylate, heating that charge to a polymerization temperature, holding the temperature constant, and observing the progress of the polymerization. When the copolymer content of the mixture reaches the desired level, e.g. 25 weight percent, additional styrene and methyl methacrylate are fed into the polymerization mixture. The composition of the polymerization mixture can be observed by removing a sample of the mixture from time to time and testing the sample by well-known analytical methods. The rate of addition of each monomer is then adjusted to maintain the desired constant composition in the reaction mixture. However, this procedure is somewhat tedious, since the absolute rate of addition of the monomers must increase as the size of the accumulated reaction charge increases in order to hold a constant copolymer content. Furthermore, the small amount of non-uniform copolymer initially formed remains to contaminate the later-formed uniform product, although in progressively lower proportion.

An improvement on the above procedure is to convert the batch process to a continuous process as soon as convenient size reaction charge has accumulated. In such modification, a portion of the homogeneous reaction mixture is continuously withdrawn as the monomer addition continues, the reaction mixture being withdrawn at a rate to hold the total quantity of reaction mixture constant as well as the ratio of monomers and proportion of copolymer product therein. The first-formed polymer is thereby flushed from the system.

A particularly convenient and practical embodiment of the above-described process is carried out in a simple reactor comprising means for feeding starting materials at controlled rates to a reaction zone, means in the reaction zone for intimately mixing the reaction mixture, means for controlling the temperature of the mixture in the reaction zone and holding that temperature substantially constant, and means for withdrawing a portion of the reaction mixture from the reaction zone at a rate equivalent to the rate of feed of starting materials to the reaction zone. By such means, constancy of reaction conditions are readily attained and maintained and a few preliminary tests suffice to determine what rates of feed and temperature are necessary in a particular apparatus to produce a desired copolymer product.

The resulting copolymer product is separated from the polymerization reaction mixture by any desired means, such as by precipitation in a liquid which is a solvent for the monomeric substances in the polymerization reaction mixture but which is not a solvent for the copolymer product. Preferably, the polymerization reaction mixture is separated by heating under reduced pressure whereby the volatile components of the composition are vaporized and the copolymer product is left as a non-volatile residue.

It will be understood by those skilled in the art that the properties of the copolymers obtained by the present method will depend inter alia upon the proportion of styrene and methyl methacrylate polymerically combined in the copolymer and the average molecular weight of that copolymer. In general, the physical properties of the new uniform copolymers are markedly better than those of known non-uniform copolymers of the same average monomeric chemical proportions and the same solution viscosity.

The term "solution viscosity" employed herein refers to the viscosity in centipoises at 25° C. of a ten percent by weight solution of the copolymer in toluene as determined by the ASTM test designated D703–49T and described in the American Society for Testing Methods 1955 Standards, page 18(e). The solution viscosity is related to polymer molecular weight, higher values of viscosity being observed with polymers having higher molecular weights and, conversely, lower viscosity values being observed with lower molecular weight polymers.

The tensile strengths of the new copolymers are consistently higher than the tensile strengths of known copolymers of styrene and methyl methacrylate having the same average chemical composition and the same solution viscosity, and pass through a maximum in the range from 50 to 85 percent by weight of methyl methacrylate in the copolymer. In general, maximum tensile strength values are attained in the present copolymers having solution viscosities at least as great as a value between about 10 and about 15 centipoises. Within this range of minimum solution viscosities, the lower values correspond to copolymers having the higher maximum tensile strengths and the higher viscosities correspond to the lower maximum tensile strength copolymers, the different maximum tensile strength copolymers being related to copolymer chemical composition as mentioned above. For any such copolymer composition, the tensile strength values are substantially constant at solution viscosities above the minimum values in the range between about 10 and about 15 centipoises as just described.

At still lower solution viscosities, i.e., below the minimum values in the range just given, the tensile strength values for the copolymers fall off. However, even at solution viscosities in the range from 5–7 to 10–15 centipoises, the tensile strength values of the new copolymers, particularly in the composition range between 50 and 85 percent by weight of methyl methacrylate, are at least as good as the best available tensile strength values of known copolymers, and are much better than the tensile strength values of known copolymers of the same solution viscosity values.

The elongation values of the new copolymers are also consistently higher than the elongation values of known copolymers of styrene and methyl methacrylate having the same average chemical composition and the same solution viscosity, and pass through a maximum in the range from 50 to 85 percent by weight of methyl methacrylate in the copolymer. Copolymers of approximately 65 percent by weight of methyl methacrylate and approximately 35 percent by weight styrene having solution viscosities of about 15 and more centipoises have shown an unexpected behavior of "necking down" when test bars are drawn out in a tensile test. Such bars can be repeatedly bent double and straightened without breaking.

The relationship between the tensile strength and solution viscosity of the new copolymers was mentioned above. Where the copolymer products are fabricated by heat, such as in injection molding, the new copolymers are particularly advantageous. In contrast to the molding temperatures required for conventionally made copolymers, the new copolymers of this invention having the same chemical composition and physical properties, e.g. tensile strength, can be molded at appreciably lower temperatures.

Control of the solution viscosity of the new copolymer products is readily obtained by selection of the polymerization reaction conditions. Generally, the solution viscosity of the copolymer product is inversely related to the copolymerization reaction temperature. When styrene and methyl methacrylate are thermally copolymerized, in the absence of non-polymerizable liquid diluents and catalysts, in the presence of a constant proportion of copolymer in the range from about ten to about 60 percent by weight of the mixture, and at a constant temperature, the solution viscosity of the resulting copolymer products is related to the copolymerization reaction temperature approximately as follows.

| Copolymerization reaction temperature, ° C.: | Solution viscosity, centipoises |
|---|---|
| 130 | 30–50 |
| 140 | 20–40 |
| 150 | 15–30 |
| 160 | 10–20 |
| 170 | 10–15 |
| 180 | 5–10 |

The solution viscosity of a copolymer made at a given temperature is dependent to some extent upon the relative proportions of styrene and methyl methacrylate in the reaction mixture, the solution viscosity of the copolymer product being generally higher with higher proportions of methyl methacrylate.

When catalysts and/or non-polymerizable liquid diluents are employed in the reaction mixture, particularly when such diluents are also chain-transfer agents, the solution viscosity values of the resulting copolymers at any polymerization temperature are lower than those just shown, the degree of lowering being dependent upon the kind and proportion of the added catalysts and/or diluent. By the same token, the use of added catalysts and/or liquid diluents in the present method permits the use of a lower constant copolymerization reaction temperature to obtain a copolymer product having the same solution viscosity. It must be remembered that the rate of polymerization is also directly related to copolymerization reaction temperature and to catalyst concentration and is inversely related to inert diluent liquid concentration in the polymerization reaction mixture.

The new copolymer products obtained in accordance with the method described above are thermoplastic solid materials that are readily molded and shaped by conventional methods into useful articles such as appliance housings and panels, shower enclosures, automobile taillights, medallions, and devices, molded letters and figures for display signs, windows, light diffusers, and counter dividers whose utility and value are enhanced by the advantageous physical properties of these new copolymers. These copolymers can be compounded in a manner well known in the art with added pigments, stabilizers, lubricants and other additives.

The following examples illustrate the invention but are not to be construed as limiting its scope.

In the examples, styrene and methyl methacrylate were copolymerized in accordance with this invention in a plurality of tests carried out in apparatus, differing in capacity and identified as reactors A, B, C, and D, each of which was arranged to operate in continuous manner as follows.

Means was provided for feeding a liquid mixture containing liquid monomers and perhaps inert liquid diluent and/or catalyst at a measured rate to a polymerization reactor consisting of a loop of coiled pipe connected to a pump for rapidly recirculating the contents of the coil in a closed circuit. The reactor was provided with means for maintaining a predetermined constant temperature in the reaction zone. At a point in the reactor coil remote from the point of introduction of the feed, there was provided means for withdrawing a portion of the recirculating polymerization mixture at a rate corresponding to the rate of introduction of the feed and in a manner so as to maintain sufficient pressure on the polymerization mixture in the reaction zone that said mixture was kept in the liquid phase. The withdrawn portion of polymerization mixture was conducted to a vacuum devolatilizer where, under reduced pressure and by application of heat, the unreacted monomers were vaporized leaving the polymer product as a residue having approximately one per cent remaining volatile material. From time to time samples were taken of the polymerization reaction mixture and of the polymer product and analysis and tests were made by conventional procedures.

The pipe coil loops in these reactors had the following characteristics.

Reactor A: ⅛-inch pipe (0.269-inch inside diameter), Inconel, 11.3 feet long.
Reactor B: 1-inch diameter tube, stainless steel, 8.3 feet long.
Reactor C: 2.5-inch diameter tube, aluminum, 7 feet long.
Reactor D: 1.25-inch diameter tube, stainless steel, 5.8 feet long.

EXAMPLE 1

Two series of polymerizations were made, one at a temperature of 140° C., the other at a temperature of 160° C., in reactor A. Each series consisted of several runs, each run differing from the others in respect to the proportion of styrene and methyl methacrylate contained in the feed mixture. No catalyst or inert diluent liquid was added to the reaction mixture. Each run was allowed to continue until equilibrium was attained whereupon samples were taken and data collected. The data are summarized in Table I.

In the Table I are shown the proportions in percent by weight of styrene and of methyl methacrylate used in the feed mixtures, the rate of feed of the monomer mixture in grams per hour, the proportion of polymer in the polymerization reaction mixture in percent by weight and the properties of the polymer product. The composition of the polymer is given in terms of the chemically combined methyl methacrylate content thereof in percent by weight, the balance of each polymer being chemically combined styrene. The chemical compositions of the copolymers were calculated from data obtained by elemental analyses for carbon and hydrogen and/or from infra-red absorption spectra. In the light of subsequent experience, the reported values are believed to be low to the extent of about 3–5 percent in the instances of high methyl methacrylate copolymers and about 5–10 percent in the instances of low methyl methacrylate copolymers.

Table I shows the intrinsic viscosity values of the polymer products in methyl ethyl ketone (MEK) at 25° C. These values are indicative of the molecular weights of the polymers and were determined in the standard way by observing the reduced specific viscosities at several dilute concentrations of the polymer in solution in methyl ethyl ketone, plotting the reduced specific viscosities as a function of concentration in grams per deciliter and extrapolating the function to zero concentration to obtain the intrinsic viscosities in terms of deciliters per gram.

Tensile strength and elongation were measured on test bars having a two-inch long intermediate portion whose cross section was ⅛ by ¼ inch. These test bars were injection molded at a temperature approximately 50° to 75° F. above the short-shot temperature in a one-ounce Watson Stillman injection molding machine at 10,000 p.s.i. ram pressure. The term "short-shot temperature" refers to that temperature at which, in injection molding at a particular ram pressure, the injected plastic just barely fails to fill the mold. The bars were tested on a Dillon tensile tester, model K, at a draw rate of 0.25-inch per minute. The values for tensile strength obtained on such test bars and by this procedure as reported in Table I are, in the light of subsequent experience believed to be high to the extent of from 500 to 1000 p.s.i. The elongation values, in percent extension at break, are believed to be reliable.

The heat distortion temperature values shown in Table I were obtained by a method described by G. A. Heirholzer and R. F. Boyer in ASTM Bulletin No. 134, May 1945, page 37.

All of the copolymers of styrene and methyl methacrylate shown in Table I were clear and transparent.

Table I

| Feed mixture | Styrene, percent | 95 | 65 | 50 | 35 | 5 | 0 |
|---|---|---|---|---|---|---|---|
| | Methyl methacrylate, percent | 5 | 35 | 50 | 65 | 95 | 100 |
| Polymerization at 140° C.: | | | | | | | |
| Rate of feed, grams per hour | | 256 | 271 | 224.6 | 214 | | 172 |
| Polymer in reaction mixture, percent | | 17.8 | 16.4 | 18.9 | 16.1 | | 10.4 |
| Polymer composition, percent methyl methacrylate | | 6.5 | 27.5 | 45.0 | 55.2 | | 100 |
| Intrinsic viscosity in MEK at 25° C., dl./gm. | | .524 | .579 | .691 | .698 | | .827 |
| Tensile strength, p.s.i. | | 8,100 | 9,160 | 11,100 | 11,300 | | 9,040 |
| Elongation, percent | | 3.0 | 3.5 | 4.8 | 5.1 | | 3.4 |
| Heat distortion temperature, ° C | | 82.6 | 84.9 | 82.5 | 84.2 | | |
| Polymerization at 160° C.: | | | | | | | |
| Rate of feed, grams per hour | | 392 | 281.5 | 299 | 409 | 421 | 223 |
| Polymer in reaction mixture, percent | | 30 | 32.5 | 25.3 | 26.5 | 11.7 | 11.0 |
| Polymer composition, percent methyl methacrylate | | 7.0 | 34.2 | 46.2 | 56.2 | 84.2 | 100 |
| Intrinsic viscosity in MEK at 25° C., dl./gm. | | .433 | .543 | .494 | .561 | .785 | .618 |
| Tensile strength, p.s.i. | | 6,260 | 10,200 | 11,000 | 11,500 | 10,900 | 9,040 |
| Elongation, percent | | 1.8 | 3.9 | 4.6 | 4.9 | 4.5 | 3.4 |

EXAMPLE 2

A number of tests were carried out in the general manner described above under particular conditions and with results shown in Table II. No added catalyst was employed in any of the tests 1–17 shown in the table.

The Table II shows, for each test, the feed composition, in percent by weight of styrene, methyl methacrylate, and of ethyl benzene where the latter was used, based on the whole feed. The table also shows the chemical composition of the resulting polymer, in percent by weight. In copolymers, these values are obtained from analyses for styrene by ultra-violet absorption spectra, methyl methacrylate being by difference. This method is believed to be more exact, reproducible, and reliable than analyses by chemical or infrared absorption methods.

The table shows the particular reactor used in each test, the polymerization temperature, the rate of feed of the monomer mixture, the rate of withdrawal of the reaction mixture (expressed as pounds per hour of polymer, the rate of withdrawal of whole reaction mixture being the same as the rate of feed), the proportion of polymer as percent by weight of the reaction mixture, and the rate of polymerization, expressed as the production of polymer in percent by weight of the reactor capacity per hour.

The withdrawn portion of reaction mixture was devolatilized under heat and vacuum as hereinbefore described to recover the polymer products.

The table also shows the properties of the resulting polymer products. The solution viscosity is the viscosity in centipoises at 25° C. of a ten percent by weight solution of the polymer in toluene as hereinbefore described. The melt viscosities were determined in poises at 700,000 dynes per square centimeter shear stress on a Caplastometer in the manner described by H. J. Karam, K. J. Cleereman, and J. L. Williams in Modern Plastics, vol. 32, No. 7, page 129 (1955). The heat distortion values were measured on a recording apparatus described by G. A. Heirholzer and R. F. Boyer in ASTM Bulletin No. 134, May 1945, page 37. The notched impact strength values, in foot-pounds per inch of notch, were determined by the ASTM test method designated D–256–56 (Izod method).

The tensile strength and elongation values were measured on test bars having a four-inch long intermediate portion whose cross-section was ⅛ by ½ inch. These test bars were injection molded at a temperature approximately 25° F. above the short-shot temperature in a one-ounce Watson Stillman injection molding machine at 10,000 p.s.i. ram pressure, the actual molding temperature being shown in the table. The bars were tested on an Instron tester at a crosshead speed of 0.25 inch per minute, the elongation being measured over a two-inch original length by extensometers (Baldwin-Lima-Hamilton PS–6M). Test bars prepared and tested in this manner are believed to give most exact, reproducible, and reliable results.

All of the copolymers of styrene and methyl methacrylate shown in Table II were clear and transparent.

Table II contains certain tests (14–17 inclusive) showing the preparation of homopolymers of styrene and of methyl methacrylate in the same apparatus and by substantially the same procedure, for use in comparing the results thereof with the copolymers produced in accordance with this invention.

In place of ethylbenzene (cf. test 13) there can be used another miscible liquid diluent of kinds and in amounts and with results as hereinbefore set forth. These tests can also be carried out with added catalysts of the kinds and with results as hereinbefore described.

It will be evident to those skilled in the art how the invention can advantageously be practiced in other ways.

Table II

| Test No. | 1 | 2 | 3 | 4 | 5 | 6 | 7 | 8 | 9 |
|---|---|---|---|---|---|---|---|---|---|
| Feed composition, percent by weight: | | | | | | | | | |
| Styrene | 80 | 70 | 70 | 60 | 50 | 50 | 50 | 40 | 30 |
| Methyl methacrylate | 20 | 30 | 30 | 40 | 50 | 50 | 50 | 60 | 70 |
| Ethylbenzene | | | | | | | | | |
| Polymer composition, percent by weight: | | | | | | | | | |
| Styrene | 74 | 68 | 68 | 58 | 51 | 51 | 51 | 44 | 36 |
| Methyl methacrylate | 26 | 32 | 32 | 42 | 49 | 49 | 49 | 56 | 64 |
| Polymerization: | | | | | | | | | |
| Reactor | B | D | C | B | C | C | B | B | C |
| Temperature, °C | 140 | 160 | 150 | 141 | 170 | 163 | 144 | 140 | 180 |
| Rate of monomer feed, pounds per hour | 4.29 | 4.01 | 11.2 | 3.55 | 16.5 | 17.0 | 4.03 | 3.69 | 8.7 |
| Rate of polymer withdrawal, pounds per hour | 0.75 | 2.01 | 6.0 | 0.67 | 10.0 | 8.5 | 0.90 | 0.59 | 5.2 |
| Polymer, percent by weight of reaction mixture | 17.5 | 50.2 | 53.5 | 19.0 | 60.0 | 50.0 | 22.1 | 16.1 | 60.0 |
| Rate of polymerization (percent per hour) | 24.0 | 65.2 | 35.3 | 21.5 | 59.0 | 50.0 | 28.6 | 19.0 | 30.6 |
| Physical properties: | | | | | | | | | |
| Solution viscosity, centipoises | 22.0 | 10.9 | 15.0 | 18.4 | 10.5 | 14.2 | 30.2 | 40.1 | 7.3 |
| Melt viscosity, poises | 11,625 | | 4,160 | 30,000 | 18,000 | 8,000 | 40,800 | | 4,340 |
| Refractive index (25°C.) | | | 1.5627 | | | | 1.5461 | 1.5363 | 1.5303 |
| Mechanical Properties: | | | | | | | | | |
| Molding temperature, ° F | 515 | 450 | 500 | 540 | 500 | 515 | 555 | 610 | 505 |
| Tensile strength, p.s.i. | 8,620 | 7,840 | 8,480 | 9,600 | 8,992 | 9,648 | 9,888 | 9,890 | 8,015 |
| Elongation, percent | 3.1 | 1.9 | 2.5 | 3.6 | 2.5 | 3.0 | 3.8 | 3.9 | 2.7 |
| Notched impact, foot-pounds per inch | 0.39 | 0.21 | 0.25 | 0.48 | 0.30 | 0.42 | 0.43 | 0.51 | 0.23 |
| Heat distortion temperature, °C | 88 | | 86 | 87 | 86 | 86 | 87 | 91 | 84 |

Table II—Continued

| Test No. | 10 | 11 | 12 | 13 | 14 | 15 | 16 | 17 |
|---|---|---|---|---|---|---|---|---|
| Feed composition, percent by weight: | | | | | | | | |
| Styrene | 30 | 30 | 20 | 8 | 100 | 100 | 100 | 0 |
| Methyl methacrylate | 70 | 70 | 80 | 77 | 0 | 0 | 0 | 90 |
| Ethylbenzene | | | | 15 | | | | 10 |
| Polymer composition, percent by weight: | | | | | | | | |
| Styrene | 36 | 36 | 28 | 17 | 100 | 100 | 100 | 0 |
| Methyl methacrylate | 64 | 64 | 72 | 83 | 0 | 0 | 0 | 100 |
| Polymerization: | | | | | | | | |
| Reactor | C | C | B | C | D | B | C | B |
| Temperature, °C | 178 | 163 | 140 | 170 | 160 | 150 | 140 | 178 |
| Rate of monomer feed, pounds per hour | 25.0 | 17.5 | 2.45 | 8.8 | 6.00 | 3.55 | 10.8 | 1.10 |
| Rate of polymer withdrawal, pounds per hour | 11.0 | 8.0 | 0.39 | 3.0 | 1.51 | 1.11 | 4.3 | 0.43 |
| Polymer, percent by weight of reaction mixture | 46.0 | 45.5 | 15.7 | 34.0 | 39.8 | 31.1 | 39.4 | 39.7 |
| Rate of polymerization (percent per hour) | 65.0 | 47.0 | 12.4 | 17.6 | 48.8 | 35.4 | 25.0 | 17.8 |
| Physical Properties: | | | | | | | | |
| Solution viscosity, centipoises | 10.5 | 17.0 | 40.4 | 11.9 | 9.0 | 19.7 | 24.8 | Insol. |
| Melt viscosity, poises | | 26,000 | | 30,250 | | 3,530 | 4,600 | |
| Refractive index (25° C.) | 1.5303 | 1.5303 | | 1.5100 | 1.5910 | 1.5910 | 1.5910 | 1.4910 |
| Mechanical properties: | | | | | | | | |
| Molding temperature, °F | 490 | 515 | 580 | 575 | 410 | 450 | 505 | 570 |
| Tensile strength, p.s.i. | 10,130 | 10,060 | 9,940 | 10,100 | 4,300 | 6,980 | 7,168 | 7,010 |
| Elongation, percent | 3.5 | 8.4 | 4.0 | 4.5 | 0.9 | 1.7 | 2.1 | 3.5 |
| Notched impact, foot-pounds per inch | 0.28 | 0.55 | 0.51 | 0.40 | 0.18 | 0.42 | 0.44 | 0.29 |
| Heat distortion temperature, °C | | 88 | 93 | 86 | 83 | 85 | 83 | 80 |

What is claimed is:

1. A method which comprises heating at a substantially constant polymerization reaction temperature in a polymerization reaction zone an anhydrous homogeneous liquid reaction mixture consisting essentially of (a) a monomeric portion consisting essentially of styrene and methyl methacrylate in a substantially constant proportion in the range from 5 to 95 parts by weight of styrene and from 95 to 5 parts by weight of methyl methacrylate in a total of 100 parts by weight of the monomeric portion, (b) the copolymer product of copolymerization of the monomeric portion in amount corresponding to a substantially constant value in the range from 10 percent by weight of the whole reaction mixture to 60 percent of the combined weights of the monomeric portion and the copolymer product, (c) a non-polymerizable, inert, anhydrous, miscible liquid diluent in amount corresponding to a substantially constant value in the range from 0 to 30, inclusive, percent by weight of the whole reaction mixture, and (d) a free-radical-generating catalyst in amount corresponding to a substantially constant value in the range from 0 to 1, inclusive, percent by weight of the whole reaction mixture, copolymerizing the styrene and methyl methacrylate in that reaction mixture, maintaining the relative proportions of the constituents of the reaction mixture substantially constant at the values aforesaid by continuously feeding to the reaction mixture further amounts of constituents (a), (c), and (d) as needed and intimately mixing the added constituents with the mixture in the reaction zone, and separating from at least a portion of the resulting reaction mixture the resulting constituent copolymer of styrene and methyl methacrylate.

2. A method according to claim 1 wherein the total quantity of reaction mixture in the polymerization reaction zone is held substantially constant by continuously withdrawing a portion of the resulting reaction mixture and separating from the withdrawn portion the constituent copolymer of styrene and methyl methacrylate.

3. A homogeneous and compositionally uniform copolymer of styrene and methyl methacrylate made by the method of claim 1.

References Cited in the file of this patent

UNITED STATES PATENTS

| | | |
|---|---|---|
| 2,321,759 | Macht et al. | June 15, 1943 |
| 2,521,754 | Shusman | Sept. 12, 1950 |
| 2,537,031 | Chaney | Jan. 9, 1951 |
| 2,769,804 | Hanson | Nov. 6, 1956 |